United States Patent
Ryon et al.

(10) Patent No.: US 12,135,130 B2
(45) Date of Patent: Nov. 5, 2024

(54) FUEL NOZZLES

(71) Applicant: Collins Engine Nozzles, Inc., Des Moines, IA (US)

(72) Inventors: Jason A. Ryon, Carlisle, IA (US); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 9 days.

(21) Appl. No.: 18/157,790

(22) Filed: Jan. 20, 2023

(65) Prior Publication Data
US 2024/0247806 A1    Jul. 25, 2024

(51) Int. Cl.
| | |
|---|---|
| *F23R 3/36* | (2006.01) |
| *F23D 14/58* | (2006.01) |
| *F23D 17/00* | (2006.01) |
| *F23R 3/28* | (2006.01) |
| *F02C 7/22* | (2006.01) |
| *F23D 11/38* | (2006.01) |
| *F23R 3/14* | (2006.01) |

(52) U.S. Cl.
CPC .............. *F23R 3/36* (2013.01); *F23D 14/58* (2013.01); *F23D 17/002* (2013.01); *F23R 3/286* (2013.01); *F02C 7/222* (2013.01); *F23D 11/383* (2013.01); *F23R 3/14* (2013.01)

(58) Field of Classification Search
CPC .... F23R 3/36; F23R 3/286; F23R 3/14; F23D 14/58; F23D 17/002; F23D 11/383; F02C 7/222
See application file for complete search history.

(56) References Cited

U.S. PATENT DOCUMENTS

| | | | |
|---|---|---|---|
| 4,566,268 A | * | 1/1986 | Hoffeins ............... F23D 17/002 60/39.463 |
| 5,408,830 A | | 4/1995 | Lovett |

(Continued)

FOREIGN PATENT DOCUMENTS

| | | |
|---|---|---|
| CN | 103697500 A | 4/2014 |
| CN | 104456627 A | 3/2015 |

OTHER PUBLICATIONS

Extended European Search Report for EP Application No. 24152332.3, dated Apr. 9, 2024, 10 pages.

*Primary Examiner* — Gerald L Sung
*Assistant Examiner* — Rene D Ford
(74) *Attorney, Agent, or Firm* — Kinney & Lange, P.A.

(57) ABSTRACT

In accordance with at least one aspect of this disclosure, a nozzle for a fuel injector includes, a nozzle body defining a central axis from a nozzle inlet to a nozzle outlet. A first fuel circuit is defined in the nozzle body configured to issue a first fuel flow from a first outlet orifice into a combustor. A second fuel circuit is defined in the nozzle body radially outward from the first fuel circuit configured to issue a second fuel flow from a second outlet orifice at a prefilmer surface of the nozzle body. A third fuel circuit is defined in the nozzle body radially outward from the second fuel circuit configured to issue a third fuel flow from a third outlet orifice at the prefilmer surface of the nozzle body. In embodiments, the first fuel circuit, the second fuel circuit, and the third fuel circuit can all be fluidly isolated from one another within the nozzle body.

17 Claims, 4 Drawing Sheets

(56) References Cited

U.S. PATENT DOCUMENTS

| | | | |
|---|---|---|---|
| 7,251,940 B2* | 8/2007 | Graves | F23D 11/107 |
| | | | 60/742 |
| 7,631,500 B2 | 12/2009 | Mueller et al. | |
| 9,115,896 B2 | 8/2015 | Abdel-Hafez et al. | |
| 9,488,371 B2 | 11/2016 | Shi et al. | |
| 2019/0032559 A1* | 1/2019 | Dai | F23R 3/286 |
| 2022/0356845 A1 | 11/2022 | Morenko et al. | |

\* cited by examiner

FUEL NOZZLES

TECHNICAL FIELD

The present disclosure relates to fuel nozzles.

BACKGROUND

Dual circuit fuel injectors are currently used in gas turbine engine combustors. The primary circuit is useful at very low flow rates (e.g., during ignition) to add fuel the primary zone. As the fuel flow rate increases, the secondary circuit activates, which can have a larger flow capacity used to fuel more areas of the combustor. However, at intermediate flow conditions, the secondary fuel velocity may be too low to allow the fuel to reach certain zones within the combustor which may cause less than optimal combustion efficiencies or instabilities in the flow.

There is always a need in the art for improvements to fuel nozzles in the aerospace industry. This disclosure provides a solution for this need.

SUMMARY

In accordance with at least one aspect of this disclosure, a nozzle for a fuel injector includes, a nozzle body defining a central axis from a nozzle inlet to a nozzle outlet. A first fuel circuit is defined in the nozzle body configured to issue a first fuel flow from a first outlet orifice into a combustor. A second fuel circuit is defined in the nozzle body radially outward from the first fuel circuit configured to issue a second fuel flow from a second outlet orifice at a prefilmer surface of the nozzle body. A third fuel circuit is defined in the nozzle body radially outward from the second fuel circuit configured to issue a third fuel flow from a third outlet orifice at the prefilmer surface of the nozzle body. In embodiments, the first fuel circuit, the second fuel circuit, and the third fuel circuit can all be fluidly isolated from one another within the nozzle body.

In embodiments, the prefilmer surface of the nozzle body can be a radially inward facing cylindrical or conical (e.g., converging or diverging) surface of a prefilmer wall radially outward from a fuel circuit portion of the nozzle body where the first, second, and third fuel circuits are defined. In embodiments, a downstream end of the prefilmer can define the nozzle outlet, wherein an air circuit of the nozzle body extends from the nozzle inlet, between the prefilmer wall and fuel circuits portion of the nozzle body, to the nozzle outlet. In embodiments, the second outlet orifice and the third outlet orifice can form a common nozzle outlet orifice radially outward of the first outlet orifice.

In certain embodiments, the second outlet orifice can be radially inward and axially upstream of the third outlet orifice. In certain such embodiments, the second outlet orifice can be configured to issue the second fuel flow through the second outlet orifice, then the third outlet orifice. In embodiments, the first outlet orifice can be configured to issue the first fuel flow along a first spray axis, the second outlet orifice can be configured to issue the second fuel flow along a second spray axis, and the third outlet orifice can be configured to issue the third fuel flow along a third spray axis. In certain embodiments, the first spray axis, the second spray axis, and third spray axis can all be parallel. In certain embodiments, the second spray axis and the third spray axis can be coaxial.

In certain embodiments, the second fuel circuit can extend into the third outlet orifice such that the second outlet orifice and the third outlet orifice are concentric. In such embodiments, the first spray axis, the second spray axis, and third spray axis can all be parallel, where no axes are coaxial. In such embodiments, the second fuel circuit and the third fuel circuit can be fluidly isolated within the nozzle body and within the third outlet orifice. In certain embodiments, the third fuel circuit further can further include a swirler upstream of the third outlet orifice configured to swirl the third fuel to produce a hollow cone spray.

In certain embodiments, the second outlet orifice and the third outlet orifice can be positioned adjacent to each other within the common nozzle outlet orifice. In certain such embodiments, the second outlet orifice can be radially inward of the third outlet orifice within the common nozzle outlet orifice relative to the second and third spray axes. In such embodiments, the second and third spray axes can be parallel or the second and third spray axes can diverge, or the second and third spray axes can converge and intersect.

In accordance with at least one aspect of this disclosure, a method can include issuing an atomized first fuel flow into a combustor via a first fuel circuit to light the combustor, issuing a second fuel flow towards a prefilmer surface via a second fuel circuit at a different pressure than the first fuel flow, issuing a third fuel flow to towards a prefilmer surface via a third fuel circuit, and staging off the second fuel flow after during issuing the third fuel flow. In certain embodiments, issuing the first fuel flow, the second fuel flow, and the third fuel flow can occur sequentially. In certain embodiments, the order of issuance of the first, second, and third fuel flows can occur in the order of the first fuel flow, the third fuel flow, then the second fuel flow.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
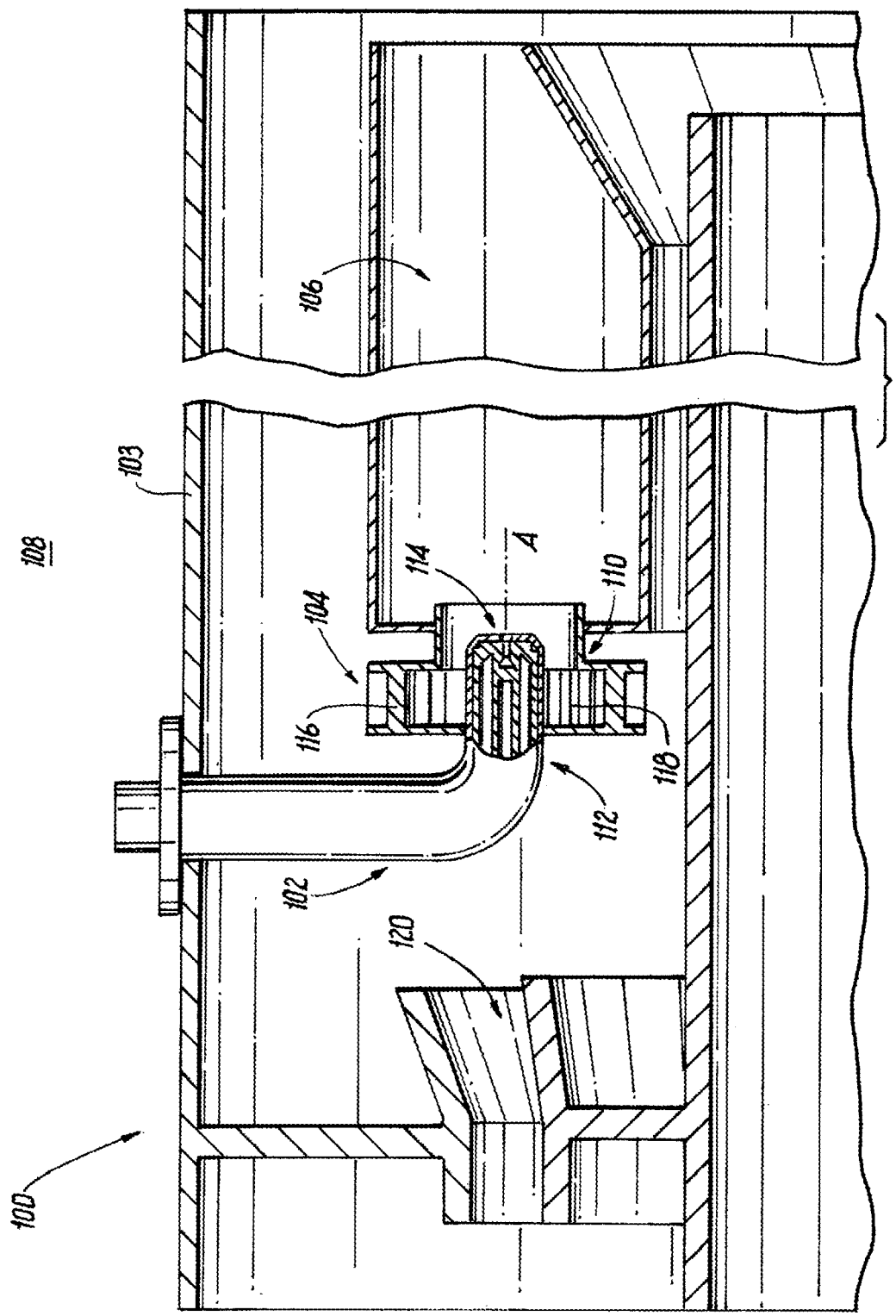
FIG. 1 is a schematic cross-sectional view of an embodiment of system in accordance with this disclosure, showing a fuel injector mounted to a combustor.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-8.

In accordance with at least one aspect of this disclosure, as shown in FIG. 1, a system 100 can include a fuel injector 102 mounted to an engine case 103. A fuel nozzle 104 can be mounted to the fuel injector 102 to issue a fuel flow into a combustion chamber 106 of an engine 108. The fuel nozzle 104 can include a nozzle body 110 defining a central axis A from a nozzle inlet 112 to a nozzle outlet 114. An air swirler 116 can be mounted to the nozzle body 110 defining at least a portion of an air circuit 118 configured to issue an air flow 119 from a compressor section 120 of the engine 108 into the combustion chamber 106.

Figure 2:
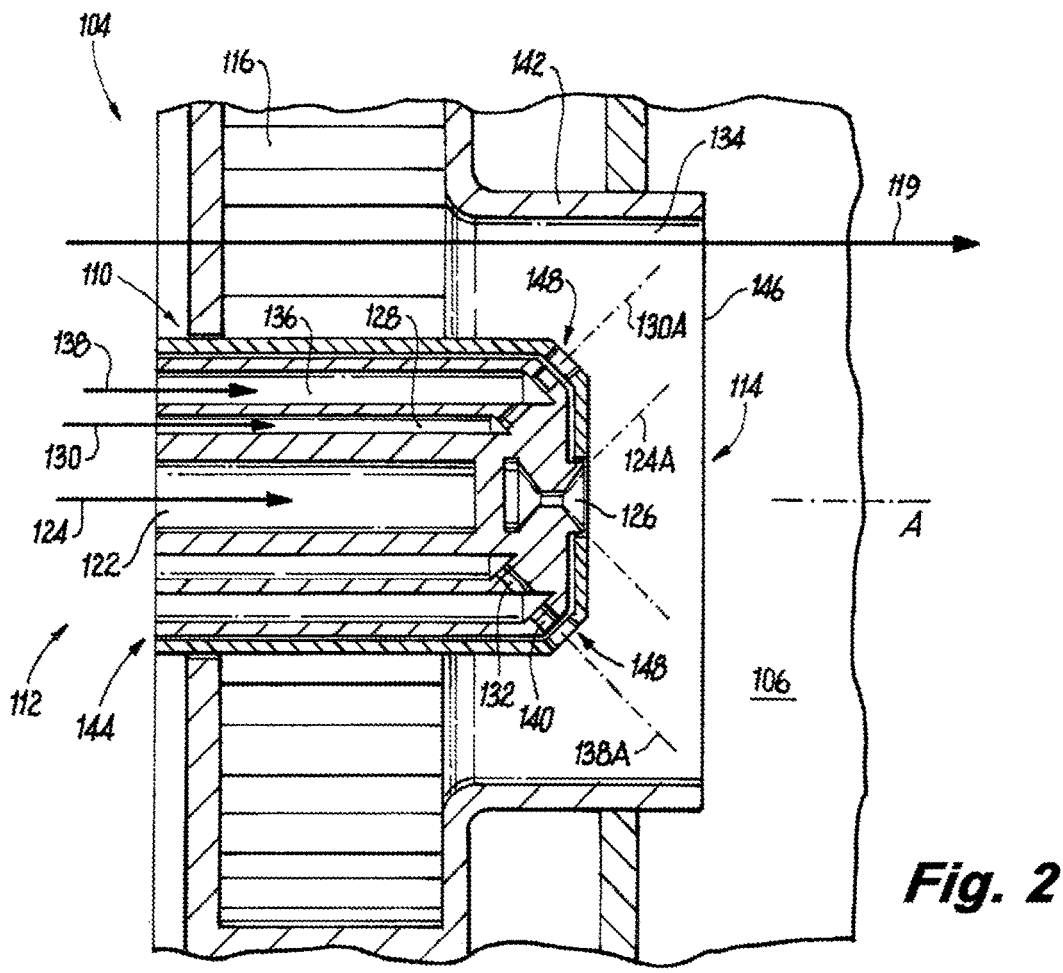
FIG. 2 is an enlarged schematic cross-sectional view of an embodiment of a fuel nozzle of the fuel injector of FIG. 1.
Figure 3:
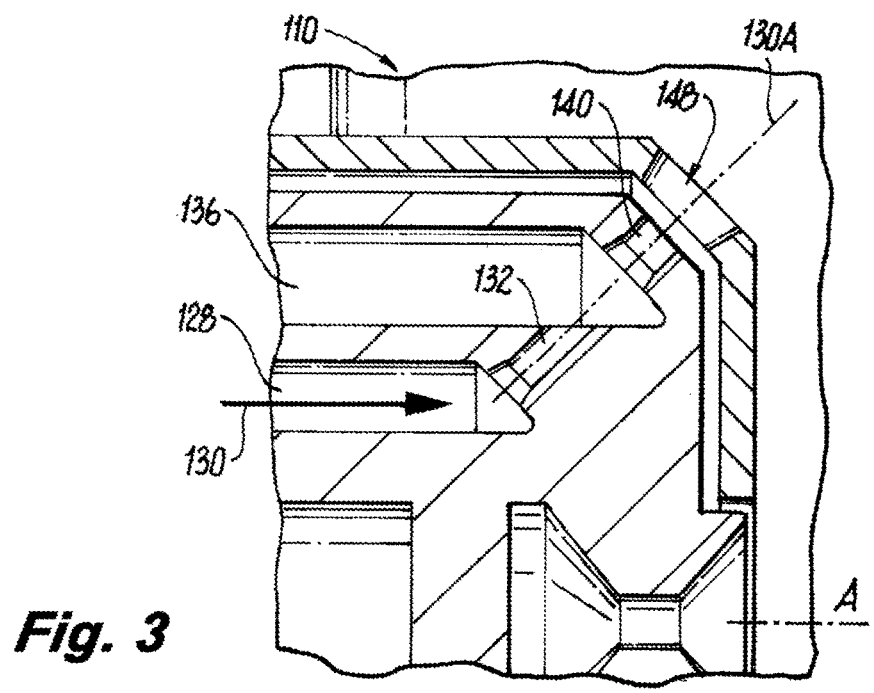
FIG. 3 is an enlarged partial view of the fuel nozzle of FIG. 2, showing one or more outlet orifices of the fuel nozzle.

Referring now to FIGS. 2-8, which show enlarged views of embodiments of the fuel nozzle 104, a first fuel circuit 122 can be defined in the nozzle body 110 configured to issue a first fuel flow 124 from a first outlet orifice 126 into the combustor 108. A second fuel circuit 128 can be defined in the nozzle body 110 radially outward from the first fuel circuit 122 configured to issue a second fuel flow 130 from a second outlet orifice 132 at a prefilmer surface 134 of the nozzle body 110. A third fuel circuit 136 can be defined in the nozzle body 110 radially outward from the second fuel circuit 128 configured to issue a third fuel flow 138 from a third outlet orifice 140 at the prefilmer surface 134. In certain embodiments, there can be some amount of fluid communication between the second fuel circuit 128 and the third fuel circuit 136 (e.g., as shown in FIGS. 2-3), where the fuel circuits cross paths (as described further below). In certain embodiments (e.g., as shown in FIGS. 4-8), the first fuel circuit 122, the second fuel circuit 128, and the third fuel circuit 136 can all be fluidly isolated from one another within the nozzle body 110.

In embodiments, e.g., as shown in FIG. 2, the prefilmer surface 134 of the nozzle body 110 can be a radially inward facing cylindrical or conical (e.g., converging or diverging) surface of a prefilmer wall 142 radially outward from a fuel circuit portion 144 of the nozzle 104 where the first 122, second 128, and third 136 fuel circuits are defined. In embodiments, a downstream end 146 of the prefilmer can define the nozzle outlet 114. The air circuit 118 can extend from the nozzle inlet 112, between the prefilmer wall 142 and fuel circuits portion 144 of the nozzle body 110, to the nozzle outlet 114. In embodiments, the second outlet orifice and the third outlet orifice can form a common nozzle outlet orifice 148 radially outward of the first outlet orifice 126. The first outlet orifice 126 can be configured to issue the first fuel flow 124 along a first spray axis 124A, the second outlet orifice 132 can be configured to issue the second fuel flow 130 along a second spray axis 130A, and the third outlet orifice 140 can be configured to issue the third fuel flow 138 along a third spray axis 138A.

With reference now to FIGS. 2 and 3 specifically, in certain embodiments, the second outlet orifice 132 can be radially inward and axially upstream of the third outlet orifice 140. In certain such embodiments, the second outlet orifice 136 can be configured to issue the second fuel flow 130 through the second outlet orifice 132, crossing into the third fuel circuit 136, then issue through the third outlet orifice 140, and ultimately out of the nozzle body 110 through the common nozzle outlet orifice 148. The second outlet orifice 132 can have a smaller diameter than the third outlet orifice 140 so that the secondary fuel circuit 128 can issue a smaller mass flow of fuel and at a higher pressure than the third fuel circuit 136, penetrating further through the air circuit 118 than the first and third fuel flows 124, 138. In embodiments, there may or may not be a fuel flow passing through the second fuel circuit 128 and the third fuel circuit 136 at the same time. As shown in FIGS. 2 and 3, the first spray axis 124A, the second spray axis 130A, and third spray axis 138A can all be parallel, and the second spray axis 130A and the third spray axis 138A can be coaxial.

Figure 4:
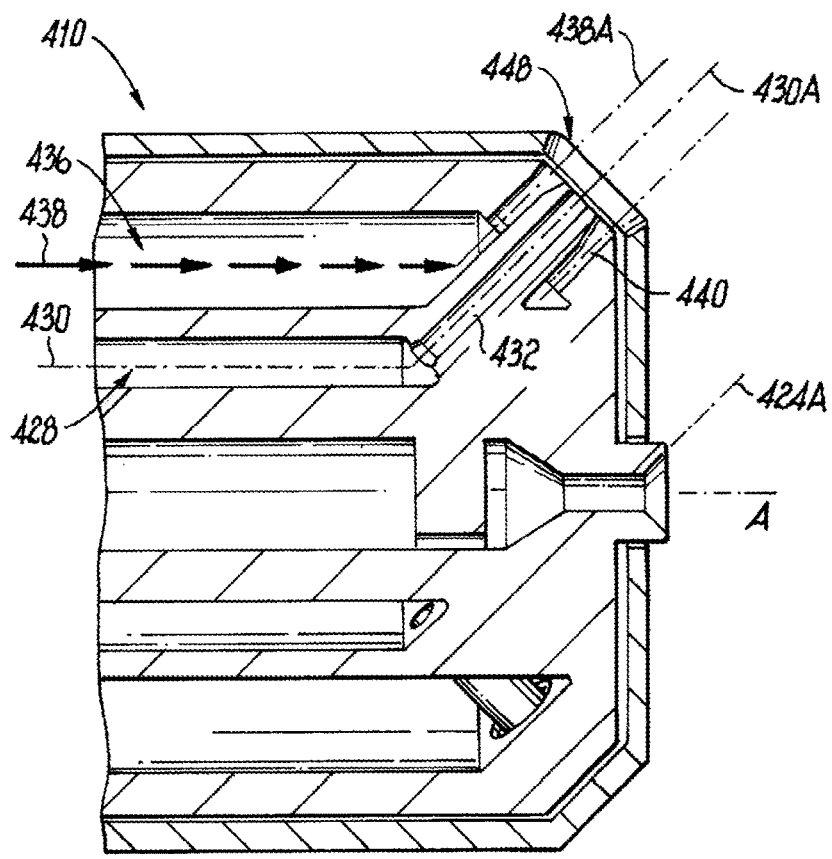
FIG. 4 is an enlarged schematic cross-sectional view of an embodiment of a fuel nozzle of the fuel injector of FIG. 1.
Figure 5:
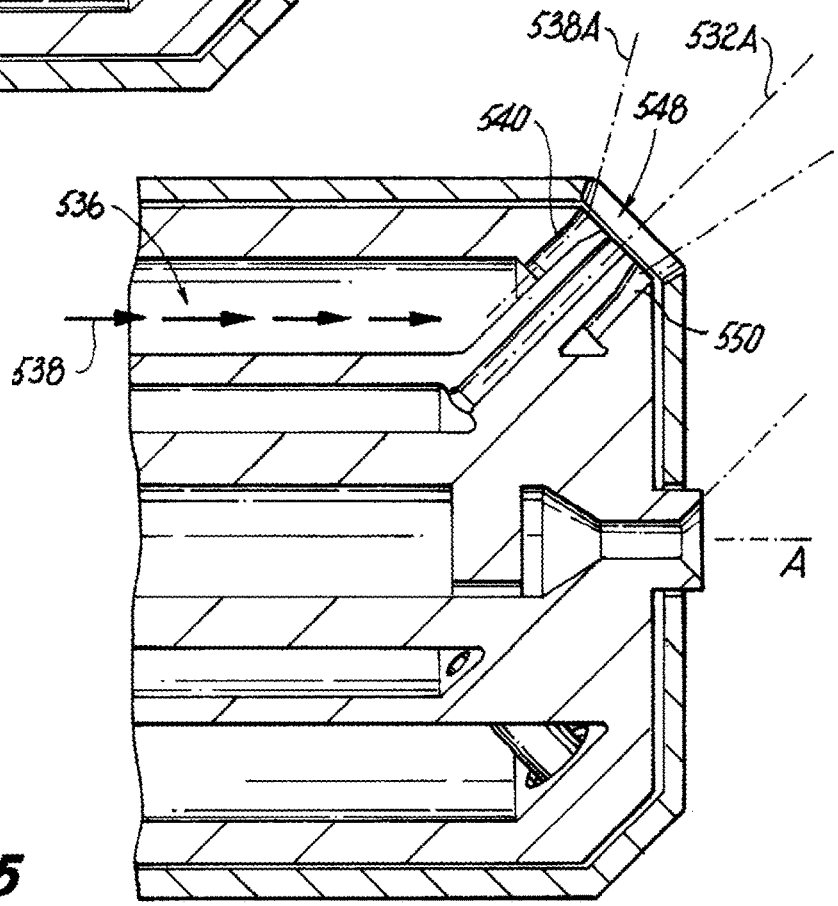
FIG. 5 is an enlarged schematic cross-sectional view of an embodiment of a fuel nozzle of the fuel injector of FIG. 1.

With reference now to FIGS. 4 and 5, the second fuel circuit 428 can extend into the third outlet orifice 440 such that the second outlet orifice 432 and the third outlet orifice 440 are concentric in forming the common nozzle outlet orifice 448. In such embodiments, the first spray axis 424A, the second spray axis 430A, and third spray axis 438A can all be parallel, but no axes are coaxial. In such embodiments, the second fuel circuit 428 and the third fuel circuit 436 can be fluidly isolated from one another within the nozzle body 410 and within the third outlet orifice 440 to limit interaction between the second fuel flow 430 and the third fuel flow 438 within the nozzle body 410. The diameter of the second outlet orifice 432 can be more similar in size to the third outlet orifice 440, for example larger than that of second outlet orifice 132 of nozzle body 110, or than in a typical dual fuel circuit nozzle. In certain embodiments, such as shown in FIG. 5, the third fuel circuit 536 further can further include a swirler 550 within or upstream of the third outlet orifice 540, and upstream of the common nozzle outlet orifice 548, configured to swirl the third fuel flow 538 to produce a hollow cone spray. In such embodiments, the second 530A and third 538A spray axes may no longer be parallel.

Figure 6:
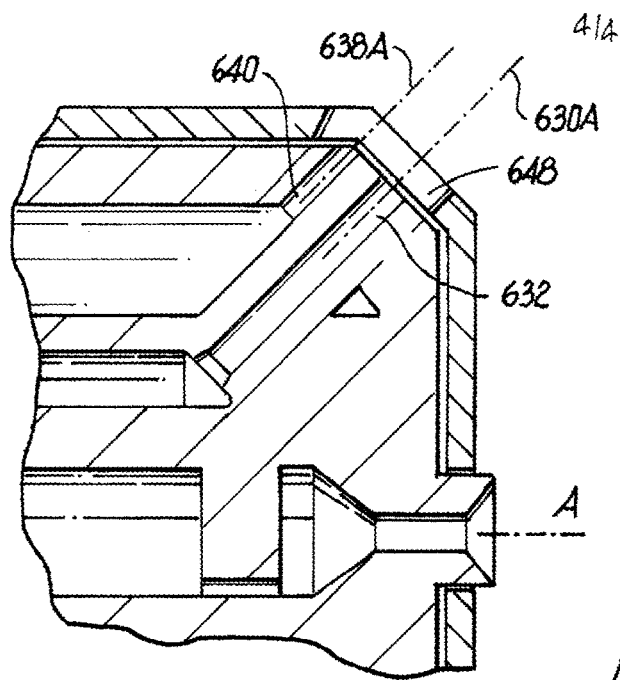
FIG. 6 is an enlarged schematic cross-sectional view of an embodiment of a fuel nozzle of the fuel injector of FIG. 1.
Figure 7:
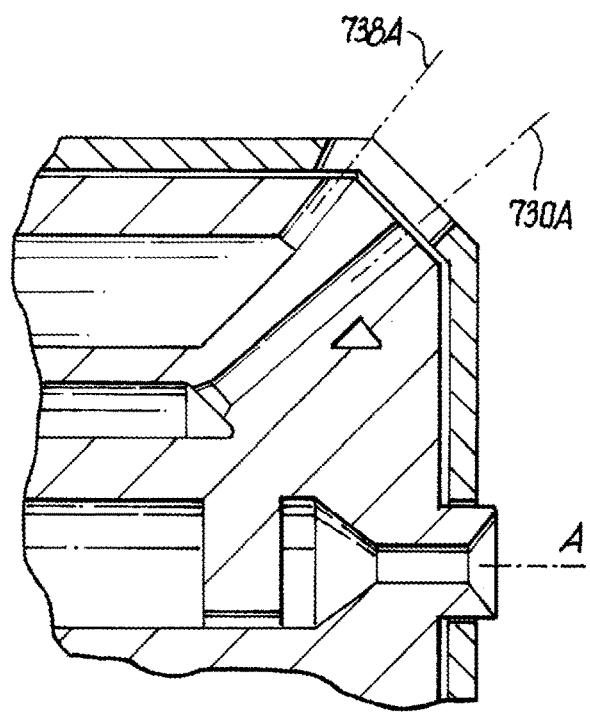
FIG. 7 is an enlarged schematic cross-sectional view of an embodiment of a fuel nozzle of the fuel injector of FIG. 1.
Figure 8:
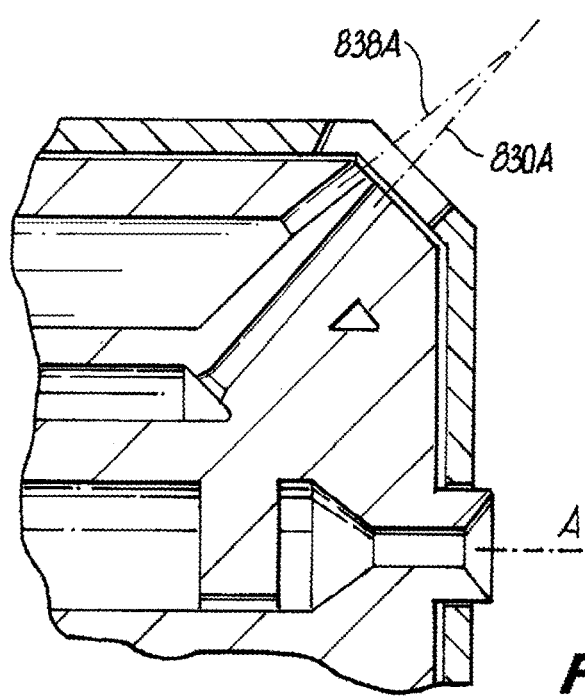
FIG. 8 is an enlarged schematic cross-sectional view of an embodiment of a fuel nozzle of the fuel injector of FIG. 1.

In certain embodiments, as shown in FIGS. 6-8, the second outlet orifice 632 and the third outlet orifice 640 can be positioned adjacent to each other within the common nozzle outlet orifice 648. This arrangement can allow for a smaller diameter third outlet orifice 640 to provide high penetration through the air circuit. Further, the arrangement shown in FIGS. 6-8 allows for cooling of the outer nozzle body via the third outlet orifice 640. In certain such embodiments, the second outlet orifice 632 can be radially inward and axially downstream of the third outlet orifice 640 within the common nozzle outlet 648, relative to the second and third spray axes 630A, 638A and the central axis A, respectively. In certain embodiments, such as shown in FIG. 6, the second and third spray axes 630A, 638A can be parallel. In certain embodiments, such as shown in FIG. 7, the second and third spray axes 730A, 738A can diverge. In certain embodiments, such as shown in FIG. 8, the second and third spray axes 830A, 838A can converge and intersect.

In accordance with at least one aspect of this disclosure, a method can include issuing an atomized first fuel flow (e.g., fuel flow 124) into a combustor (e.g., combustor 108) via a first fuel circuit (e.g., fuel circuit 122) to light the combustor, issuing a second fuel flow (e.g., fuel flow 130) towards a prefilmer surface (e.g., surface 134) via a second fuel circuit (e.g., fuel circuit 128) at a different pressure than the first fuel flow (e.g., a pressure less than or greater than the first pressure based on a given engine power condition), issuing a third fuel flow (e.g., fuel flow 138) to towards the prefilmer surface via a third fuel circuit (e.g., fuel circuit 136), and staging off the second fuel flow after during issuing the third fuel flow. In certain embodiments, issuing the first fuel flow, the second fuel flow, and the third fuel flow can occur sequentially. In certain embodiments, the order of issuance of the first, second, and third fuel flows can occur in the order of the first fuel flow, the third fuel flow, then the second fuel flow, for example, depending on the size of each circuit and or orifice, the flow need for the given engine condition, or the relative location of the orifices in the nozzle body. For example, in certain engine conditions, the fuel flow can start low, using only a single circuit, then increase flow up to three circuits.

In a traditional dual circuit nozzle, a secondary fuel circuit is included to add additional fuel flow to the primary circuit. For example, during engine startup, the primary fuel circuit can issue the first fuel flow, then when needed, the secondary circuit can issue additional fuel flow. However, in certain instances, the secondary fuel flow may still not provide enough fuel, or may provide too much additional fuel. Embodiments therefore allow for more precise control of fuel flow during all engine conditions, for example when a mass flow is needed that is between the primary flow alone and the primary flow plus the secondary flow.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A nozzle for a fuel injector, comprising:
   a nozzle body defining a central axis from a nozzle inlet to a nozzle outlet;
   a first fuel circuit defined in the nozzle body configured to issue a first fuel flow from a first outlet orifice into a combustor;
   a second fuel circuit defined in the nozzle body radially outward from the first fuel circuit configured to issue a second fuel flow from a second outlet orifice; and
   a third fuel circuit defined in the nozzle body radially outward from the second fuel circuit configured to issue a third fuel flow from a third outlet orifice, wherein an inward surface of the nozzle body is a radially inward facing cylindrical or conical surface of a first wall radially outward from a fuel circuit portion of the nozzle body where the first, second, and third fuel circuits are defined, wherein a downstream end of the inward surface defines the nozzle outlet, wherein an air circuit of the nozzle body extends from the nozzle inlet, between the first wall and fuel circuits portion of the nozzle body, to the nozzle outlet, and wherein the second fuel flow and the third fuel flow form combine and issue from a common nozzle outlet orifice radially outward of the first outlet orifice.

2. The nozzle of claim 1, wherein the second outlet orifice is radially inward and axially upstream of the third outlet orifice, wherein the second outlet orifice is configured to issue the second fuel flow through the second outlet orifice, then the third outlet orifice.

3. The nozzle of claim 2, wherein the first outlet orifice is configured to issue the first fuel flow along a first spray axis, wherein the second outlet orifice is configured to issue the second fuel flow along a second spray axis, wherein the third outlet orifice is configured to issue the third fuel flow along a third spray axis, wherein the first spray axis, the second spray axis, and third spray axis are all parallel.

4. The nozzle of claim 3, wherein the second spray axis and the third spray axis are coaxial.

5. The nozzle of claim 1, wherein the second fuel circuit extends into the third outlet orifice such that the second outlet orifice and the third outlet orifice are concentric.

6. The nozzle of claim 5, wherein the first outlet orifice is configured to issue the first fuel flow along a first spray axis, wherein the second outlet orifice is configured to issue the second fuel flow along a second spray axis, wherein the third outlet orifice is configured to issue the third fuel flow along a third spray axis, wherein the first spray axis, the second spray axis, and third spray axis are all parallel.

7. The nozzle of claim 6, wherein the second fuel circuit and the third fuel circuit are fluidly isolated within the nozzle body and within the third outlet orifice.

8. The nozzle of claim 5, wherein the third fuel circuit further includes a swirler upstream of the third outlet orifice configured to swirl the third fuel to produce a hollow cone spray.

9. The nozzle of claim 1, wherein the second outlet orifice and the third outlet orifice are positioned adjacent to each other within the common nozzle outlet orifice.

10. The nozzle of claim 9, wherein the first outlet orifice is configured to issue the first fuel flow along a first spray axis, wherein the second outlet orifice is configured to issue the second fuel flow along a second spray axis, wherein the third outlet orifice is configured to issue the third fuel flow along a third spray axis.

11. The nozzle of claim 9, wherein the second outlet orifice is radially inward of the third outlet orifice within the common nozzle outlet orifice relative to the second and third spray axes.

12. The nozzle of claim 9, wherein the second and third spray axes are parallel.

13. The nozzle of claim 9, wherein the second and third spray axes diverge.

14. The nozzle of claim 13, wherein the second and third spray axes converge and intersect.

15. The nozzle of claim 1, wherein the first fuel circuit, the second fuel circuit, and the third fuel circuit are all fluidly isolated from one another within the nozzle body.

16. The nozzle of claim 1, wherein the first wall is a prefilmer wall.

17. The nozzle of claim 16, wherein the inward surface is a prefilmer surface.

* * * * *